United States Patent [19]

Knight

[11] 4,168,793
[45] Sep. 25, 1979

[54] APPARATUS FOR CARRYING LOADS THROUGH THE USE OF BACKPACK FRAMES

[76] Inventor: William E. Knight, 5000 Park Pl., Bethesda, Md. 20016

[21] Appl. No.: 896,397

[22] Filed: Apr. 14, 1978

Related U.S. Application Data

[63] Continuation-in-part of Ser. No. 630,081, Nov. 7, 1975, Pat. No. 4,087,030.

[51] Int. Cl.² ............................................. A45F 3/00
[52] U.S. Cl. .......................................... 224/162; 5/88; 254/186 HC; 224/157; 224/261
[58] Field of Search ................. 224/25 A, 25 R, 5 R, 224/5 A, 5 B, 5 F, 5 H, 8 R, 9, 6, 8 A; 5/82 R, 82 A, 84, 88, 83, 81 R, 85; 248/359, 360; 254/186 HC, 186 R, 139.1

[56] References Cited

U.S. PATENT DOCUMENTS 2,495,804   1/1950   Berchtold .................... 254/186 HC
2,710,975   6/1955   Stoen et al. ................... 5/84
3,964,182   6/1976   Pomeret et al. .............. 224/5 B

FOREIGN PATENT DOCUMENTS 2527295   11/1976   Fed. Rep. of Germany .......... 224/5 B Primary Examiner—Stanley H. Tollberg
Assistant Examiner—Kenneth Noland
Attorney, Agent, or Firm—William E. Mouzavires

[57] ABSTRACT

A backpack frame is especially designed, together with ancillary equipment, to make easier the transportation of a litter or other load carrier by two or more human bearers acting in concert. The backpack frame contains features which permit the attachment of a connecting device which may in turn be attached to the frame of a litter or load carrier. The connecting device is attached to the backpack frame by means of a system of cables connected to a hand-operated winch which is mounted on the frame and which permits upward or downward adjustment of the height at which the load is carried while the bearers are actually in motion.

19 Claims, 12 Drawing Figures

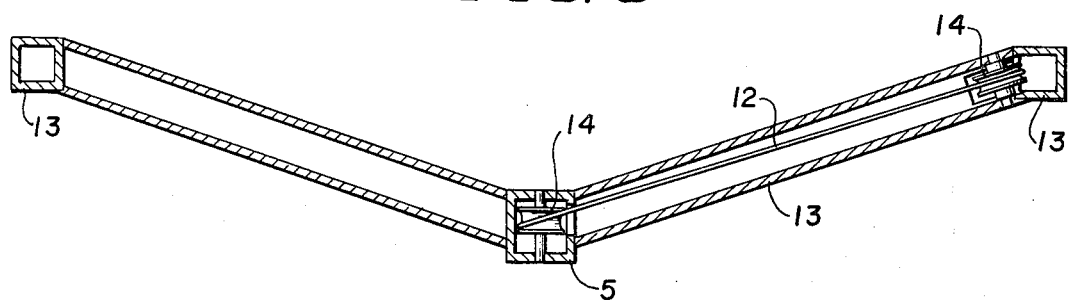
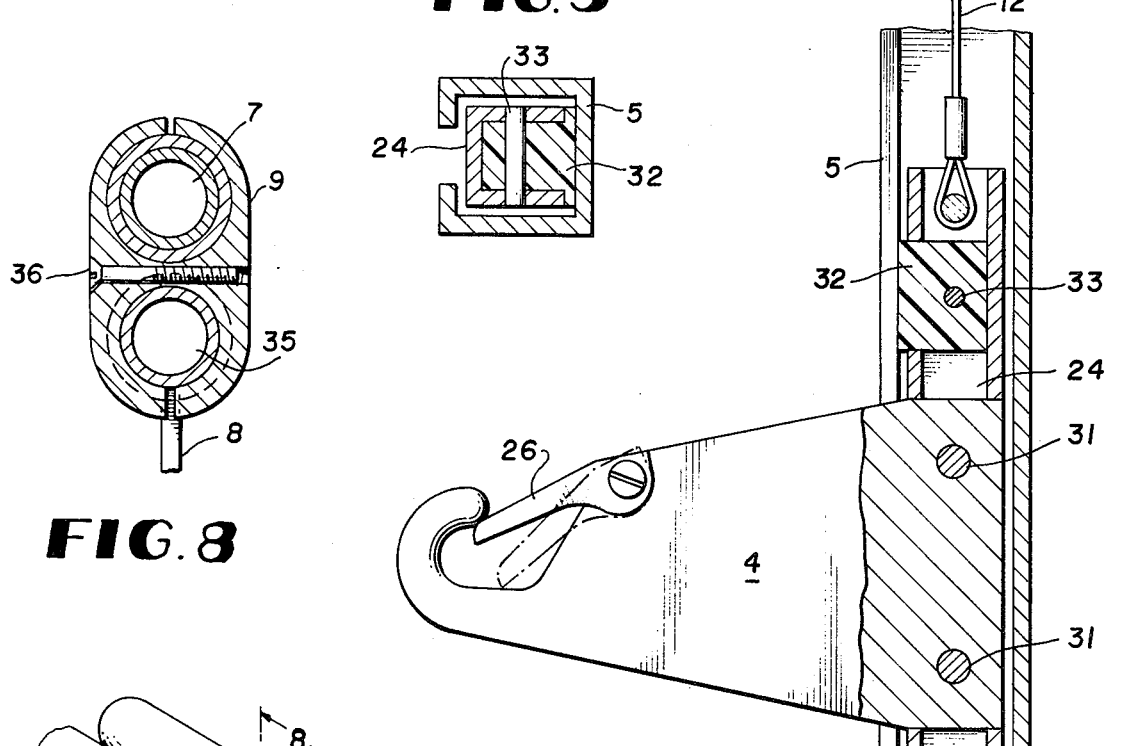
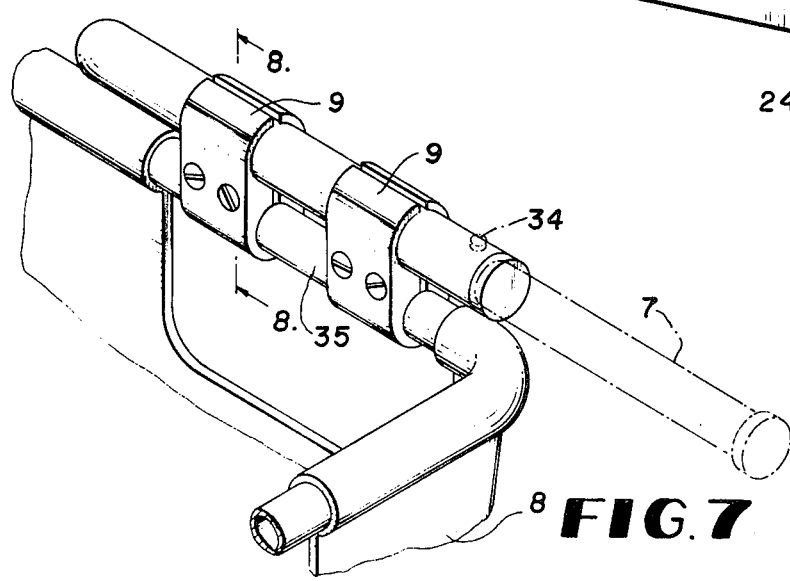

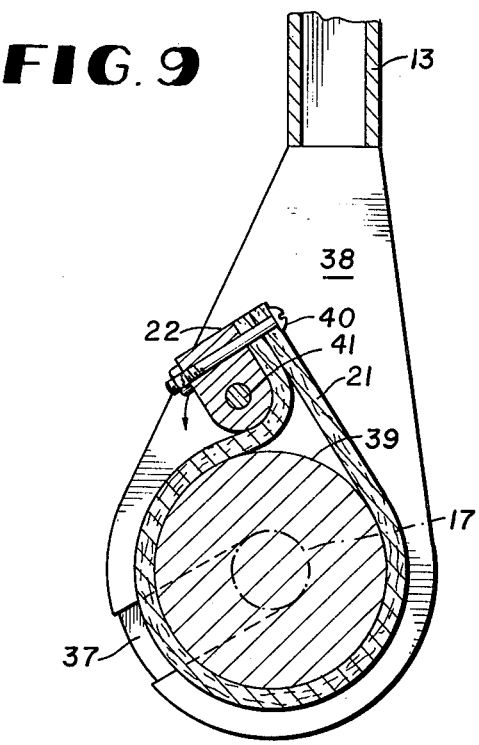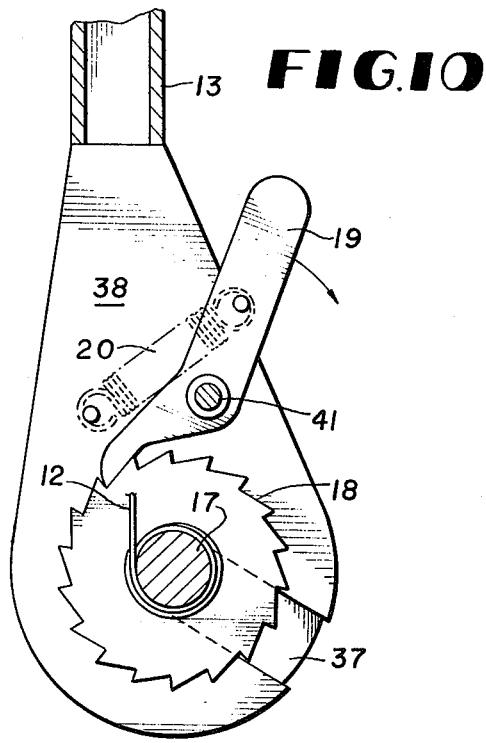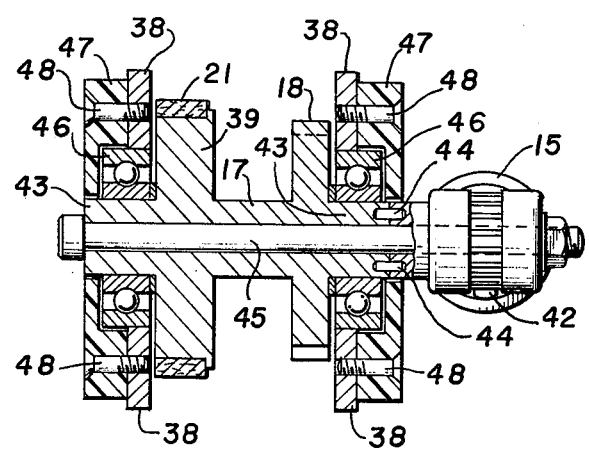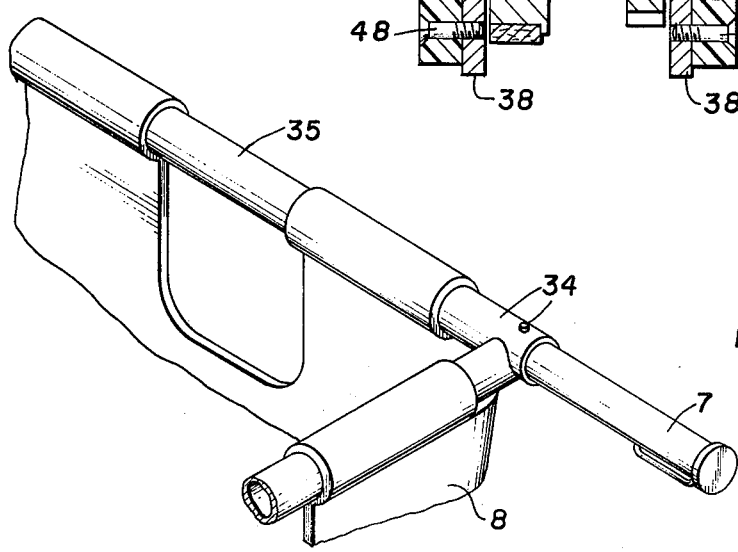

4,168,793

APPARATUS FOR CARRYING LOADS THROUGH THE USE OF BACKPACK FRAMES

RELATED PATENT APPLICATION

The present application is a continuation-in-part of my prior pending application Ser. No. 630,081, filed Nov. 7, 1975, entitled "A BACKPACK FRAME-BORNE CARRIER FOR A PATIENT OR OTHER LOADS", now U.S. Pat. No. 4,087,030.

OBJECTS OF THE INVENTION

One of the primary objects of the present invention, when a patient or other load is being carried by means of backpack frames borne by two or more human bearers acting in concert, is to provide improved apparatus making possible the continual upward or downward adjustment of the height at which the burden is carried by each bearer while the burden is actually being carried. This permits the bearers, in the face of continual changes in the trail or terrain, both to keep the burden level and to ensure that it is at all times shared equally among them as they proceed.

Another object of the invention is the provision on such a backpack frame of a motor or force-multiplying mechanism or other power mechanism making easier the raising and lowering of the load carrier relative to the backpack frame.

SUMMARY OF THE INVENTION

The present application is directed to the following inventions: an improved specialized backpack frame; a power mechanism such as a winch or similar device built into or releasably attached to the backpack frame capable of controlled operation in both reeling in and paying out a cable that it carries; a movable mounting means which travels freely along a vertical member of the backpack frame and which is attached to the cable issuing from the winch; and connecting means which may be attached on the one hand to the mounting means and on the other hand to the frame member of a stretcher or load carrier or to a telescopic extension of the stretcher's frame member.

DRAWINGS

FIG. 4 is an enlarged side elevational view, with portions shown in cross section, of a portion of a vertical frame member of the specialized backpack frame, showing the movable mounting means which travels freely within the frame member and the cable which attaches the mounting means to the winch;

FIG. 5 is a fragmental cross section view taken generally along lines 5—5 of FIG. 4 illustrating the structure of the movable mounting means and its relationship to the walls of the backpack frame vertical member within which it travels;

FIG. 6 is a cross-sectional top plan view of the specialized backpack frame taken generally along lines 6—6 of FIG. 2 showing the arrangement of the cable passing over pulleys and through the frame members of the backpack frame as it connects the movable mounting means to the winch;

FIG. 7 is a perspective view of a detachable telescoping arm clamped to the frame member of a standard stretcher or load carrier, but with the backpack frame, the movable mounting means and the connecting means not shown;

FIG. 8 is a cross-sectional side elevation view, taken generally along lines 8—8 of FIG. 7, of the clamp by means of which the telescoping arm shown in FIG. 7 is attached to the frame member of a standard stretcher;

FIG. 9 is a fragmental cross section side elevational view of a portion of the winch taken generally along lines 9—9 of FIG. 2;

FIG. 10 is a fragmental cross section side elevational view of a portion of the winch taken generally along lines 10—10 of FIG. 2;

FIG. 11 is a cross-sectional bottom elevation view of the winch taken generally along lines 11—11 of FIG. 2; and FIG. 12 is a perspective view of one corner of a stretcher or load carrier modified to include a built-in telescoping extendable arm to which may be secured the connecting means which joins the backpack frame to the stretcher.

DETAILED DESCRIPTION

Figure 1:
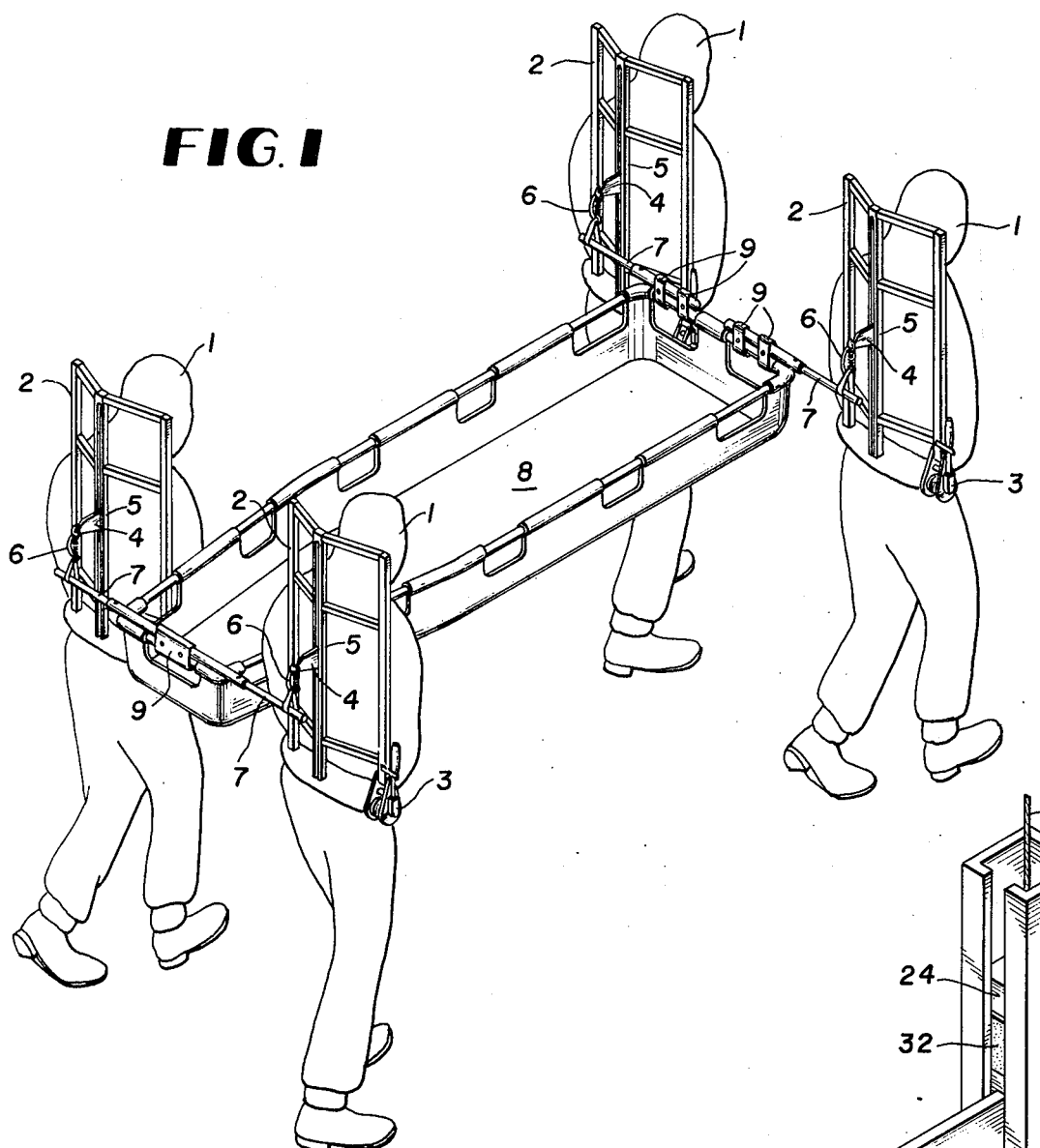
FIG. 1 is a perspective view of a standard stretcher or load carrier being carried by four human bearers equipped with the preferred embodiment of the backpack frame and connecting means of the present invention.

Referring now to the drawings, FIG. 1 shows a general undetailed view of the improved methods and apparatus for the transportation of loads by human bearers acting in concert, as taught in the present invention. The preferred embodiment of the backpack frames, each containing the design features which permit the continual adjustment of the height at which the burden is carried, is shown being used with a standard, non-specialized stretcher. The load, not shown, may be a stricken person or other cargo supported by a stretcher or load carrier frame. The human bearers are generally designated 1. Each bearer is wearing backpack frame 2 which contains a built-in hand-operated winch 3 connected by a cable (not shown in this figure) to movable mounting means 4 which slides freely up and down vertical member 5 of the backpack frame. Each mounting means is releasably attached to a connecting means 6 which is, in turn, releasably attached to telescoping arm 7. Telescoping arm 7 is releasably attached to a frame member of stretcher or load carrier 8 by clamp 9.

Figure 2:
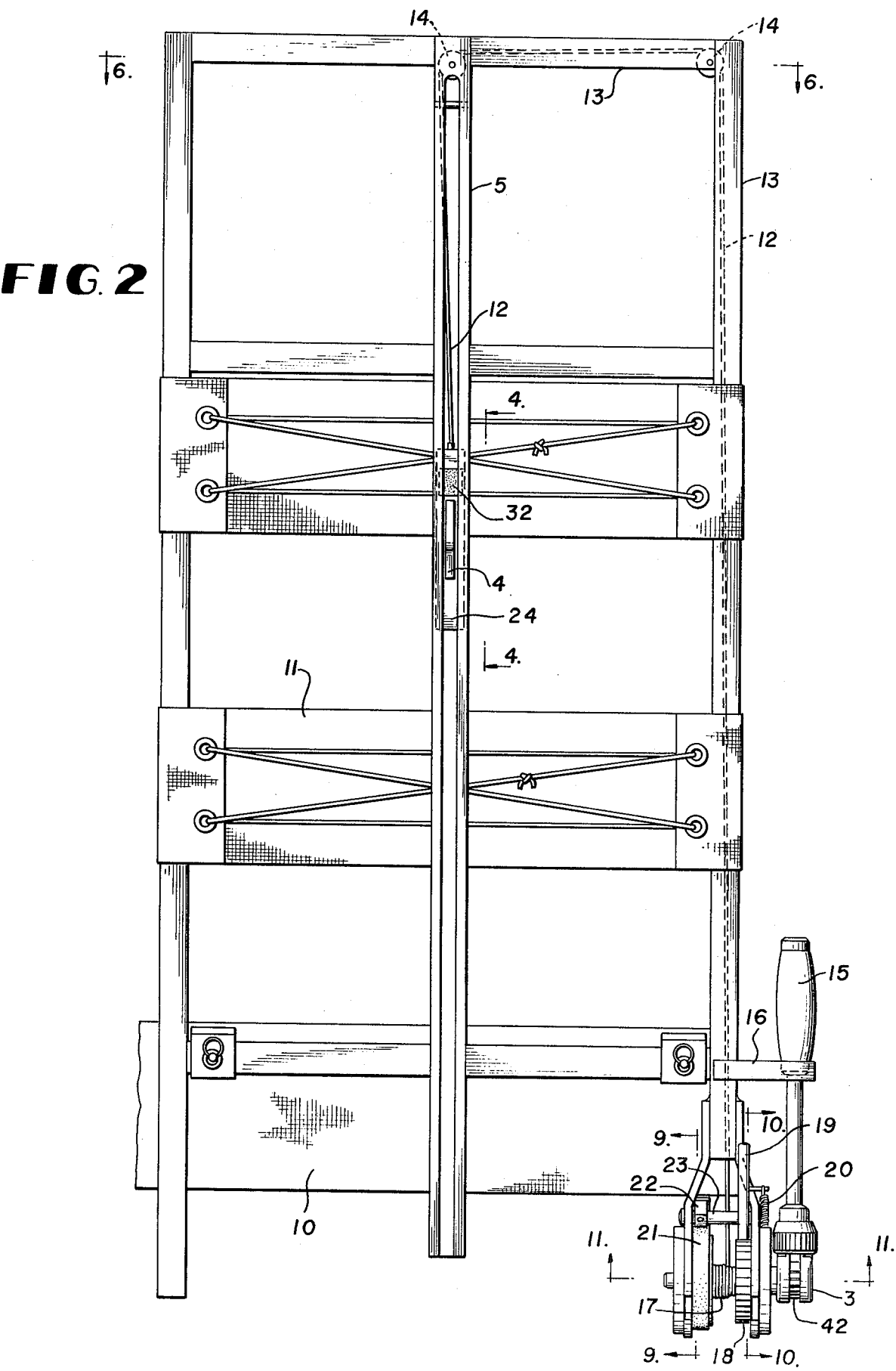
FIG. 2 is a rear elevational view of the preferred embodiment of the backpack frame of the present invention, including the movable mounting means, the hand-operated winch, and the cable connecting one to the other.

As shown in FIG. 2, which is the preferred embodiment of the apparatus permitting the continual adjustment of the height at which the burden is carried, number 10 is the hip belt and 11 is the back webbing of the backpack frame. The cable connecting movable mounting means 4 to winch 3 is shown as 12; it moves within hollow pack frame members 5 and 13, passing over pulleys 14 at the top of the pack frame verticals.

Referring to FIGS. 2, 9, 10 and 11, the winch assembly includes a spool generally designated 17 having opposite hubs 43 mounted in bearings 46. The bearings in turn are held in position by means of face plates 47 secured by screws 48 to spaced frame portions 38, these spaced frame portions being affixed to the lower extremity of backpack frame member 13. FIGS. 9 and 10 show two slots 37 cut into the spaced frame portions which permit the winch mechanism to be slipped into place when the apparatus is being assembled. Cable 12 is fixed to and wound at one end about spool 17 in such fashion that rotation of the spool raises and lowers movable mounting means 4 when it is necessary to adjust the position of the load. Any suitable mechanism for rotating the spool may be used, but in the preferred embodiment shown in FIGS. 2 and 11, handle or lever 15 is fixed to one of the spool hubs 43 by means of dowels 44 and bolt 45 in such fashion that the handle extends in a vertical plane at the lower end of the backpack frame to permit convenient manipulation by the user. The handle is joined to the hub through a reversible ratchet 42, such as those commonly used in braces and bits. This ratchet permits rotation of the spool by a series of back and forth movements of the handle through a portion of its arc. When handle 15 is not in use it is stowed securely by clamp 16 in a vertical position parallel to backpack frame member 13.

As shown in FIG. 10, the winch system also contains a second ratchet mechanism forming a part of spool 17. This ratchet normally permits the spool to rotate in one direction only during raising of movable mounting means 4. It includes ratchet wheel 18 fixed to the spool, and ratchet pawl 19 pivotally mounted by yoke 41 relative to backpack frame 38 so as to releasably engageable with the ratchet wheel. A suitable biasing mechanism shown as tension coil spring 20 is provided with one end fixed to the pawl and the other end fixed relative to the backpack frame for releasably urging the ratchet pawl into engagement with the ratchet wheel.

When ratchet pawl 41 is released from ratchet wheel 18 to permit lowering of movable mounting means 4, it is desirable that the rotation of the spool be kept under restraint in order that the lowering of the burden may take place under the full control of the user. To this end, a brake mechanism is provided as shown in FIGS. 9 and 11. In this embodiment, brake drum 39 is fixed relative to spool 17, and brake band 21, made from any suitable material, surrounds the brake drum so as to be frictionally engageable with it. The brake band is anchored at one end by means of what may be referred to as a "pinch roll," shown at number 22 in FIG. 9. This pinch roll may be manipulated to increase the pressure between the brake band and the brake drum or to release the pressure between them. The pinch roll and pawl 19 are interconnected by yoke 41 which is easily manipulatable by the hand of the user so that, when the ratchet pawl is released from the ratchet wheel, the pinch roll will by the same movement be pivoted, thus increasing the pressure between the brake band and the brake drum and controlling the lowering of the burden as desired.

Figure 3:
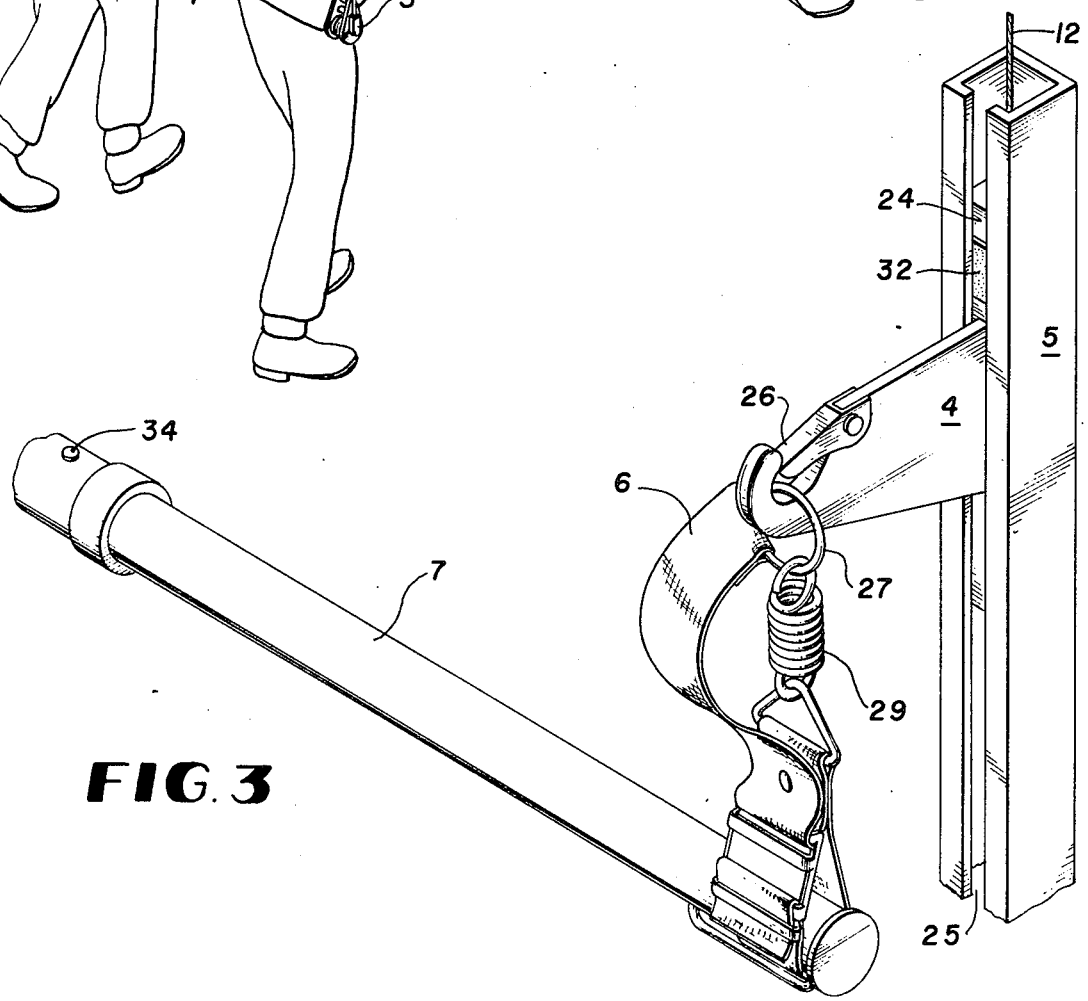
FIG. 3 is a perspective view of the movable mounting means on the backpack frame, the telescoping arm which is either a part of, or is clamped to, the frame member of a stretcher or load carrier, and the connecting means which attaches the mounting means to the telescoping arm.

FIG. 3 shows the features which connect the backpack frame to the stretcher or load carrier. The vertical member of the backpack frame is 5; the movable mounting means is composed of two body portions. First body portion 24 travels within backpack frame member 5 and is suspended from cable 12. Second body portion 4 projects in a posterior direction through continuous vertical slot 25 extending along the rearward-facing wall of backpack frame member 5. At the end of said second body portion is a hook with movable catch 26 which releasably receives and holds ring 27 at one end of connecting means 6. The other end of connecting means 6 is strapped to telescoping arm 7 which is in turn attached either permanently or by clamps to the frame of a stretcher or load carrier (not shown in this figure). The connecting means also includes spring 29 which serves as a shock absorber and load equalizer.

In FIG. 4, the numbering is as set forth in FIG. 3. In addition, however, FIG. 4 shows dowel 30 to which cable 12 is attached and dowels 31 that unite first body portion 24 of the movable mounting means to second body portion 4. In order to reduce friction as mounting means 24 moves up and down in its channel bearing its heavy load, low-friction plugs 32 of nylon or other suitable material are inserted at the top and bottom of the movable mounting means at the points of maximum friction between said means and the interior walls of backpack frame member 5. Dowels 33 hold the plugs in place.

As shown in FIG. 5, mounting means 24 hangs within backpack frame vertical member 5. This figure also shows the positioning of low-friction plug 32 and dowel 33 which holds the plug in place.

FIG. 6 shows cable 12 passing over pulleys 14 and through backpack frame members 5 and 13 as it moves between the winch and the mounting means.

FIG. 7 shows telescoping arm 7 affixed by means of clamps 9 to frame member 35 of a standard, non-specialized stretcher or load carrier 8. The telescoping arm is releasably held in extended or retracted position by spring-loaded detent 34.

As shown in FIG. 8, clamp 9 releasably attaches telescoping arm 7 to frame member 35 of non-specialized stretcher or load carrier 8. The two halves of clamp 9 are held firmly together by screw 36.

FIG. 12 illustrates how telescoping arm 7 may be incorporated in frame member 35 of specialized stretcher or load carrier 8. Releasable detent 34 holds the arm securely in its extended and retracted positions.

Although in the preferred embodiment the mechanism used to permit continual adjustment of the height at which the burden is carried takes the form of a winch and cable, other embodiments could achieve the same end within the terms of this invention. A hydraulic system operated by a hand pump could do it. A pattern of rigid drive shafts rotated by a geared crank similar to that used in a standard hand-operated drill could also do it, with the rotary motion converted into vertical motion of a threaded shaft mounted in the backpack frame vertical, to which the mounting means might be attached. A battery driven motor could also be used to drive the spool.

METHOD OF OPERATION

The method of operation of this equipment is as follows: (1) each bearer dons a specialized backpack frame; (2) the patient or other load is placed in the carrier as it rests on the ground, or on its folding legs if it has them; (3) telescoping arms 7 are clamped to the frame members of the carrier and then extended (however, if they are built into the carrier, as in FIG. 12, they are simply extended); (4) a connecting means 28 is strapped to the end of each telescoping arm 7; (5) the bearers then, acting together, raise the stretcher or load carrier to the approximate level at which it is to be carried; (6) each connecting means ring 27 is slipped into each catch 26 on the second body portion of mounting means 4; (7) when it is necessary for all bearers to raise the burden to a higher level, or for one or more bearers to raise their own portion to level the load, those concerned do so by operating the handles of their winches; (8) when it is necessary for one or more of the bearers to lower the burden, each one does so by first reversing control 3 of the two-way ratchet on his or her winch handle 15 and then depressing pawl 19. This both disengages the pawl from the teeth of spool ratchet 18 and at the same time tightens brake band 21, permitting the burden to be lowered smoothly and under full control.

While it might be preferable if all members of the carrying team were to have this equipment, it is to be noted that through use of the specialized backpack frame, the connecting means and the telescoping arm, a single bearer would be able to use the equipment even if others were carrying by hand.

OTHER APPLICATIONS OF THE INVENTION

Other possible applications readily come to mind for the basic concept embodied in this invention, which is the incorporation of a power means in a harness designed to be strapped to an individual, with the power means being operated by the individual himself. Other devices presently shown in the art teach the use of a spool attached to harness strapped to an individual for controlled lowering of the individual, as for example in fire escape equipment. However, none that I have been able to find teach such an apparatus permitting the individual to raise himself by means of the winch that he himself carries. In addition to the field of fire escaping, applications might be found in mountain climbing, tree care, house repair, etc. In such uses, it might be preferable to locate the winch in front of the bearer, rather than behind, and at approximately chest level, in order to center the weight on the cable and afford the wearer easy access to the winch handle.

What is claimed is:

1. A packback frame adapted to be worn by a user for carrying a load through means of the backpack frame, the backpack frame comprising: vertical members adapted to be secured on the back of a user, a movable mounting means for releasably attaching a load to the backpack frame rearwardly of the user, means for mounting the movable mounting means to one of said vertical members for vertical movement therealong to any desired position along a length of said one of the vertical members, and power means for raising and lowering the movable mounting means whereby the vertical position of the load may be adjusted continuously or intermittently by the user during a load carrying operation while the backpack frame is worn by the user.

2. The backpack frame defined in claim 1 wherein said power means includes a winch system.

3. The backpack frame defined in claim 2 wherein said winch system includes a spool mounted to the frame for rotation, and a cable having one end secured to and wound around the spool and an opposite end connected to said movable mounting means.

4. The backpack frame defined in claim 3 wherein said winch system includes a hand-operated lever for rotating said spool.

5. The backpack frame defined in claim 4 wherein said spool and said hand-operated lever are located at a lower end portion of the frame to permit convenient control by the user of the backpack frame.

6. The backpack frame defined in claim 3 wherein said one vertical member has a hollow elongated passage therein receiving said cable and said movable mounting means.

7. The backpack frame defined in claim 3 wherein said winch system includes a spool ratchet means for releasably engaging said spool to permit rotation of said spool in one direction whereby said movable mounting means may be raised.

8. The backpack defined in claim 7 wherein said winch system includes a brake means releasably engageable with said spool for retarding rotation of the spool in the opposite direction when said spool ratchet means is released to permit lowering of said movable mounting means.

9. The backpack frame defined in claim 8 wherein there is further included means for simultaneously releasing said spool ratchet means and applying said brake means to said spool.

10. The backpack frame defined in claim 8 wherein said brake means includes a brake drum fixed to said spool and a brake band located about the brake drum to be frictionally engageable therewith.

11. The backpack frame defined in claim 10 wherein said spool ratchet means includes a ratchet wheel fixed to said spool, a ratchet pawl releasably engageable with said ratchet wheel and spring means biasing said ratchet pawl into engagement with said ratchet wheel.

12. The backpack frame defined in claim 11 further including actuating means interconnecting said ratchet pawl and said brake band such that release of the ratchet pawl from the ratchet wheel also tends to cause increased frictional engagement of the brake band with the brake drum.

13. The backpack frame defined in claim 1 wherein said one vertical member extends generally along the longitudinal centerline of the backpack frame.

14. The backpack frame defined in claim 13 wherein said frame includes a second vertical member constituting one side of the frame and wherein said power means includes a cable having one end connected to said movable mounting means, and means connected to the other end of the cable for driving the cable, said means for driving the cable being mounted to said second vertical member.

15. The backpack frame defined in claim 14 wherein said means for driving the cable includes a spool on which the cable is wound, and means for driving the spool in rotation.

16. The backpack frame defined in claim 15 wherein said first and second vertical members have elongated hollow passages receiving said cable.

17. The backpack frame defined in claim 16 wherein said means for driving said spool includes a manual lever connected to said spool, a reversible ratchet means for permitting driving of said spool by successive movements of said lever through a portion of its arc, and a further ratchet means mounted on the spool for permitting rotation of the spool in one direction whereby said movable mounting means is raised, said spool ratchet also includes means whereby said spool may be released to permit rotation of the spool in the opposite direction to permit lowering of said movable mounting means.

18. The backpack frame defined in claim 17 wherein said means to permit rotation of the spool in the opposite direction includes brake means for retarding rotation of said spool in said opposite direction, when said spool ratchet is released, to permit said movable mounting means to be lowered with control.

19. The backpack frame defined in claim 18 wherein there is included means for simultaneously releasing said spool ratchet means and for applying said brake means to said spool.

* * * * *